United States Patent
Zhang et al.

(10) Patent No.: US 11,353,648 B2
(45) Date of Patent: Jun. 7, 2022

(54) BACKLIGHT MODULE AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Gongtao Zhang, Beijing (CN); Jian Sang, Beijing (CN); Haiwei Sun, Beijing (CN); Guangquan Wang, Beijing (CN); Zhihui Zeng, Beijing (CN); Jianbiao Ding, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 656 days.

(21) Appl. No.: 16/305,264

(22) PCT Filed: Feb. 11, 2018

(86) PCT No.: PCT/CN2018/076318
§ 371 (c)(1),
(2) Date: Nov. 28, 2018

(87) PCT Pub. No.: WO2019/019613
PCT Pub. Date: Jan. 31, 2019

(65) Prior Publication Data
US 2021/0223464 A1    Jul. 22, 2021

(30) Foreign Application Priority Data
Jul. 27, 2017    (CN) .......................... 201710629143.2

(51) Int. Cl.
G02F 1/13357    (2006.01)
F21V 8/00    (2006.01)
G02F 1/1335    (2006.01)

(52) U.S. Cl.
CPC ......... *G02B 6/0088* (2013.01); *G02B 6/0073* (2013.01); *G02F 1/133524* (2013.01)

(58) Field of Classification Search
CPC ............... G02B 6/0088; G02B 6/0073; G02F 1/133524
See application file for complete search history.

(56) References Cited

U.S. PATENT DOCUMENTS

2006/0171170 A1* 8/2006 Lee ..................... G02B 6/0088
362/632
2009/0051846 A1* 2/2009 Horiuchi .............. G02B 6/0021
349/58

(Continued)

FOREIGN PATENT DOCUMENTS

CN    101303479 A    11/2008
CN    102175002 A    9/2011

(Continued)

OTHER PUBLICATIONS

Chinese Office Action in Chinese Application No. 201710629143.2, dated Jul. 24, 2019 with English translation.

(Continued)

*Primary Examiner* — Donald L Raleigh
(74) *Attorney, Agent, or Firm* — Collard & Roe, P.C.

(57) ABSTRACT

Embodiments of the present disclosure provide a backlight module and a display device. The backlight module includes a backboard, the backboard includes a base plate and a plurality of side plates perpendicular to the base plate. The plurality of side plates are connected end to end around the base plate, and define an accommodating space having an opening with the base plate. The backlight module further (Continued)

includes a light guide plate (LGP) located in the accommodating space and a light source located at a light incident side of the LGP. The light source includes a substrate and a light emitting element disposed on the substrate, the substrate is parallel to and mounted on one side plate. One light emergent side of the light-emitting element (302) is opposite to the light incident side of the LGP.

14 Claims, 7 Drawing Sheets

(56) References Cited

U.S. PATENT DOCUMENTS

| | | | | |
|---|---|---|---|---|
| 2010/0027291 | A1* | 2/2010 | Hamada | G02B 6/0085 |
| | | | | 362/613 |
| 2010/0328580 | A1* | 12/2010 | Kim | G02B 6/009 |
| | | | | 349/64 |
| 2012/0242929 | A1* | 9/2012 | Ohyama | G02B 6/0068 |
| | | | | 349/61 |
| 2012/0281153 | A1 | 11/2012 | Kuromizu | |
| 2013/0100373 | A1 | 4/2013 | Choi et al. | |
| 2015/0138472 | A1 | 5/2015 | Yu et al. | |
| 2015/0301272 | A1 | 10/2015 | Chang | |
| 2015/0369994 | A1 | 12/2015 | Chae et al. | |
| 2017/0139122 | A1 | 5/2017 | Zhou et al. | |
| 2018/0017728 | A1* | 1/2018 | Edamitsu | G02B 6/0021 |
| 2018/0226014 | A1* | 8/2018 | Komanduri | G02B 6/0051 |

FOREIGN PATENT DOCUMENTS

| | | | | | |
|---|---|---|---|---|---|
| CN | 102305982 | A | | 1/2012 | |
| CN | 102620203 | A | | 8/2012 | |
| CN | 102681234 | A | | 9/2012 | |
| CN | 103591512 | A | | 2/2014 | |
| CN | 103823319 | A | | 5/2014 | |
| CN | 104864294 | A | | 8/2015 | |
| CN | 105842919 | A | | 8/2016 | |
| CN | 105842919 | A | * | 8/2016 | ............... F21S 8/00 |
| CN | 107247364 | A | | 10/2017 | |
| CN | 107783222 | A | * | 3/2018 | ............ G02B 6/009 |
| EP | 3104219 | A1 | * | 12/2016 | ........... G02B 6/0036 |
| KR | 200380056 | Y1 | * | 3/2005 | ....... G01F 1/133615 |
| KR | 20170057927 | A | * | 5/2017 | ............ G02B 6/005 |
| WO | WO-2012063759 | A1 | * | 5/2012 | ............... F21S 4/28 |
| WO | WO-2012124503 | A1 | * | 9/2012 | ............ G02B 6/009 |

OTHER PUBLICATIONS

International Search Report of PCT/CN2018/076318 in Chinese, dated May 10, 2018, with English translation.

Notice of Transmittal of the International Search Report of PCT/CN2018/076318 in Chinese, dated May 10, 2018.

Written Opinion of the International Searching Authority of PCT/CN2018/076318 in Chinese, dated May 10, 2018 with English translation.

* cited by examiner

BACKLIGHT MODULE AND DISPLAY DEVICE

CROSS REFERENCE TO RELATED APPLICATIONS

This application is the National Stage of PCT/CN2018/076318 filed on Feb. 11, 2018, which claims priority under 35 U.S.C. § 119 of Chinese Application No. 201710629143.2 filed on Jul. 27, 2017, the disclosure of which is incorporated by reference.

TECHNICAL FIELD

Embodiments of the present disclosure relate to a backlight module and a display device.

BACKGROUND

Thin film transistor liquid crystal display (TFT-LCD) is provided with a backlight module for providing a light-emitting element. The backlight module can be classified into direct-lit type and side-lit type. The side-lid backlight module has a relatively smaller thickness, and hence is advantageous in reducing a thickness of the entire display device, thereby benefiting an ultrathin design of the display device.

With continuous development of display technology, it not only needs to satisfy user's demands on ultrathin display device but also has to meet user's design requirements on narrow bezel (or ultra-narrow bezel). In the existing technology, for realizing the design of narrow bezel, it's usually to bond an IC (driving chip) onto a flexible printed circuit board (FPCB). In such case, it has no need of encapsulating the IC in a Pad region of a display panel, so as to reduce a width of the Pad region and achieve the objective of narrow bezel.

Based on the above, it's required to assemble the display panel with the backlight module to complete the manufacture of the display device. However, since the width of the backlight module has not been reduced effectively, the assembled display device still cannot achieve the desirable effect of narrow bezel even if the Pad region of the display panel can be made narrow.

SUMMARY

Embodiments of the present disclosure provide a backlight module and a display device, which can achieve the design of narrow bezel by reducing the width of the backlight module.

In order to achieve the above-mentioned objectives, embodiments of the present disclosure utilize technical solutions as below.

On one aspect, embodiments of the present disclosure provide a backlight module. The backlight module includes a backboard, the backboard includes a base plate and a plurality of side plates perpendicular to the base plate; the plurality of side plates are connected end to end around the base plate, and define an accommodating space having an opening with the base plate; the backlight module further includes a light guide plate (LGP) located in the accommodating space and a light source located at a light incident side of the LGP; the light source includes a substrate and a light-emitting element disposed on the substrate, the substrate is parallel to and mounted on one of the plurality of side plates; one light emergent side of the light-emitting element is opposite to the light incident side of the LGP.

In some examples, the substrate is provided with a wiring structure which is connected to the light-emitting element and is configured to drive the light-emitting element.

In some examples, the side plate mounted with the substrate is provided with a mounting hole at a position corresponding to the light-emitting element, the light-emitting element is fitted in the mounting hole by passing through the mounting hole; the substrate is connected to a surface of a side of the side plate mounted with the substrate facing away from the LGP.

In some examples, the backlight module is disposed at a non-display side of a display panel; the plurality of side plates include a first side plate mounted with the substrate and a second side being not mounted with the substrate, the second side plate is configured to support the display panel.

In some examples, in a light-shielding region of the backlight module, a position on the base plate close to the first side plate is provided with a concaved portion; the concaved portion is protruded from a side of the base plate facing away from the LGP, along a direction facing away from the LGP; a height of the first side plate is greater than a height of the second side plate, and an upper surface of the second side plate is flush with or above an upper surface of the first side plate.

In some examples, the backlight module further includes a diffusion plate and at least one layer of prismatic lens plate which are stacked sequentially at a side of the LGP facing away from the base plate; an adhesive layer is disposed between the prismatic lens plate and the diffusion plate, and is disposed in the light-shielding region of the backlight module; in the light-shielding region, a side of the prismatic lens plate facing away from the diffusion plate is adhered with an end of a light-shielding tape, and the other end of the light-shielding tape is adhered to the side plate.

Alternatively, in some examples, the backlight module further includes a diffusion plate and at least one layer of prismatic lens plate which are stacked sequentially at a side of the LGP facing away from the base plate; a first connecting layer is disposed on a surface of the side of the LGP facing away from the base plate, between the diffusion plate and the side plate; the first connecting layer and a side of the diffusion plate are engaged with each other; an upper surface of the first connecting layer is provided with a second connecting layer; the second connecting layer and a side of the prismatic lens plate are engaged with each other.

In some examples, a support plate is disposed on a surface of the first side plate facing away from the base plate, and is disposed in the light-shielding region of the backlight module; the support plate is connected to the first side plate and is parallel to the base plate; the support plate is configured to support the display panel.

In some examples, at least one pad layer is arranged between the light-emitting element and a lower surface of the concaved portion.

In some examples, the backlight module further includes a reflector plate located between the LGP and the base plate; the at least one pad layer includes a first pad sublayer and a second pad sublayer which are sequentially stacked on the base plate and are connected to each other; wherein the first pad sublayer is connected to a lower surface of the reflector plate; the second pad sublayer is connected to the light-emitting element and the LGP.

In some examples, at least one light emergent side of the light-emitting element, except a light emergent side opposite to the light incident side of the LGP, is covered with a white wall; a material of forming the white wall is white resin or silica gel.

In some examples, the light-emitting element includes a LED chip disposed on the substrate and a fluorescent layer covering the LED chip; wherein the substrate is provided with a plurality of light-emitting elements, fluorescent layers of adjacent two light-emitting elements are disposed at interval; or, fluorescent layers of all the light-emitting elements are integrally formed.

In some examples, the substrate of the light source and the side plate mounted with the substrate are adhered with each other through a double faced adhesive tape.

In some examples, a material of forming the first connecting layer and the second connecting layer is double faced adhesive tape.

In some examples, the at least one layer of prismatic lens plate includes an upper prismatic lens plate and a lower prismatic lens plate; and an extending direction X of a prismatic lens on the upper prismatic lens plate is perpendicular to an extending direction Y of a prismatic lens on the lower prismatic lens plate.

In some examples, the at least one layer of prismatic lens plate includes a single prismatic lens plate, and the single prismatic lens plate includes two prismatic lenses of which extending directions are perpendicular to each other.

On the other aspect, embodiments of the present disclosure provide a display device including any one of the above-mentioned backlight modules.

As above, embodiments of the present disclosure provide a backlight module and a display device. The backlight module has a light-shielding region, and a frame of the display device with such backlight module can cover the light-shielding region. As a result, a magnitude of a width of the light-shielding region is in direct proportion to a width of the frame mentioned above. Additionally, the light source mentioned above is disposed within the light-shielding region. In order to prevent the light-shielding region from light leakage, a light-shielding tape may be disposed above the light source. In such case, since a length of a substrate of the light source is much greater than a thickness of the substrate, when the substrate is mounted on a side plate in a manner of being parallel to the side plate, the light source occupies a space with a relatively smaller horizontal dimension, as compared with the case where the substrate is fixed on a LGP in a manner of being parallel to a base plate. In such case, it only needs to cover the entire light source by the above-mentioned light-shielding tape along a thickness direction of the substrate, which can reduce the length of the light-shielding tape, and hence can reduce the width of the above-mentioned light-shielding region, thereby achieving the objective of narrowing the frame.

BRIEF DESCRIPTION OF THE DRAWINGS

Hereinafter, the embodiments of the present invention will be described in a more detailed way with reference to the accompanying drawings, so as make one person skilled in the art be able to understand the present invention more clearly, wherein:

FIG. 6 is a schematic diagram illustrating an illumination of the light source in the backlight module illustrated in FIG. 4a;

REFERENCE NUMERALS

Hereinafter, the technical solutions in the embodiments of the present disclosure will be described in a clearly and fully understandable way in connection with the drawings in the embodiments of the present disclosure so that the objectives, technical solutions and advantages of the embodiments of the present discourse will be more apparent. It is obvious that the described embodiments are just a part but not all of the embodiments of the disclosure. Based on the described embodiments herein, one person skilled in the art can obtain other embodiment(s), without any inventive work, which should be within the scope of the disclosure.

Unless otherwise defined, the technical terminology or scientific terminology used herein should have the same meaning as commonly understood by one of ordinary skill in the art to which this invention belongs. Likewise, terms like "first," "second," etc., which are used in the description and the claims of the present application for invention, are not intended to indicate any sequence, amount or importance, but distinguish various components. The phrases "connect", "connected", etc., are not intended to define a physical connection or mechanical connection, but may include an electrical connection, directly or indirectly. "On," "under," "left," "right" or the like is only used to describe a relative positional relationship, and when the absolute position of a described object is changed, the relative positional relationship might also be changed accordingly.

Figure 1:
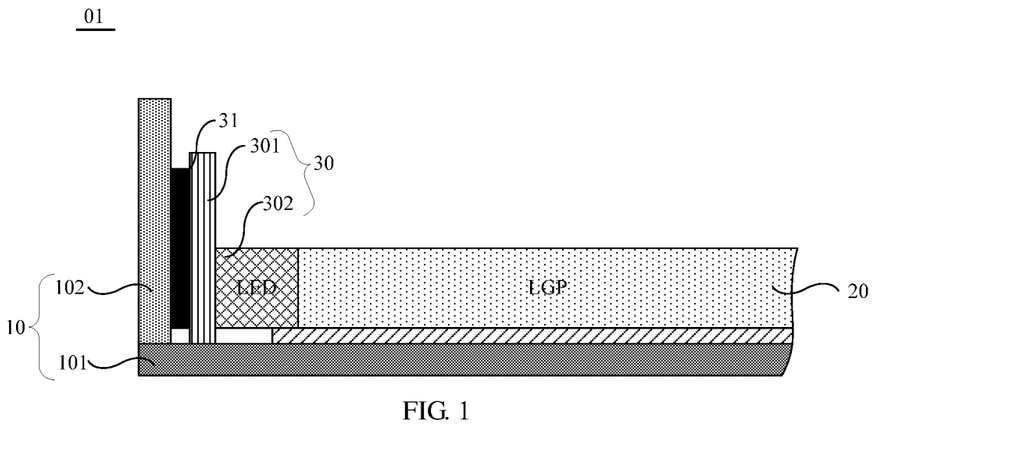
FIG. 1 is a structural diagram of a backlight module provided by an embodiment of the present disclosure.
Figure 2:
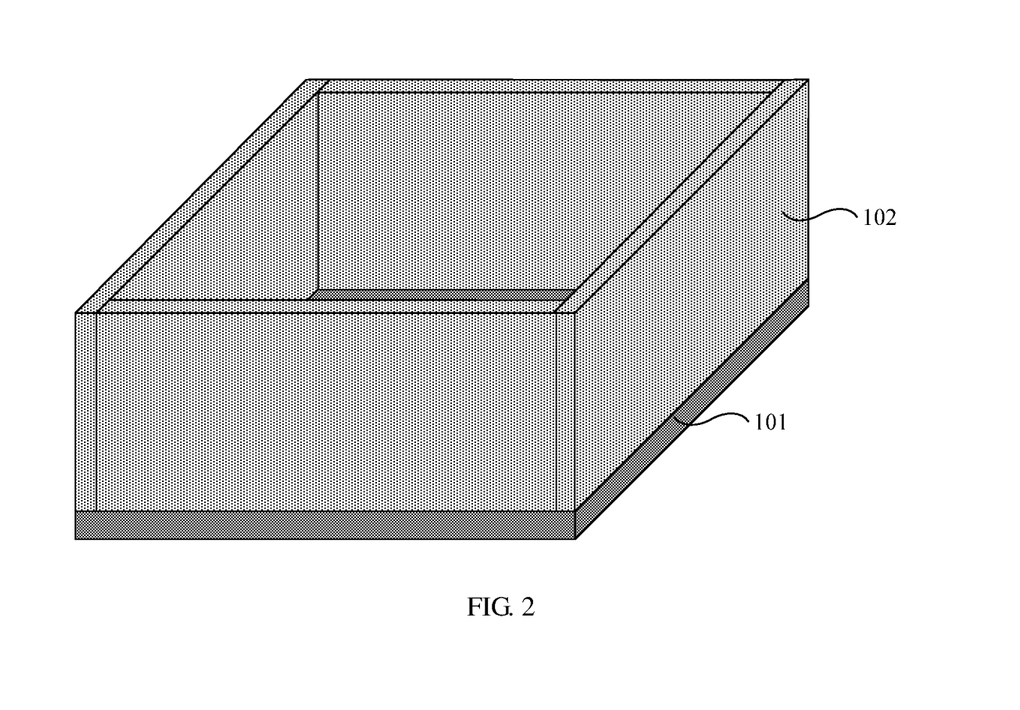
FIG. 2 is a structural diagram of a backboard in the backlight module of FIG. 1.

Embodiments of the present disclosure provide a backlight module 01. As illustrated in FIG. 1, an embodiment of the backlight module 01 includes a backboard 10; the backboard 10 includes a base plate 101 and a plurality of side plates 102 perpendicular to the base plate 101. As illustrated in FIG. 2, the plurality of side plates 102 are connected, end to end, around the base plate 101, and define an accommodating space having an opening with the base plate 101. The accommodating space is provided with a light guide plate (LGP) 20 therein, and a light source 30 located on a light incident side of the LGP 20. The LGP 20 has a plate-like structure, and at least one side of the LGP 20 is the light incident side of the LGP 20.

Figure 3:
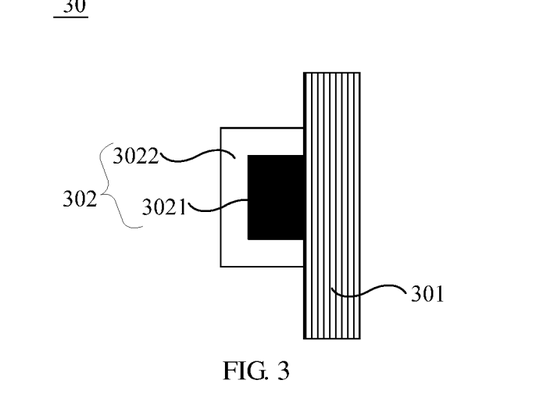
FIG. 3 is a structural diagram of a light source in the backlight module of FIG. 1.

In an embodiment, as illustrated in FIG. 3, the light source 30 includes a substrate 301 and a light-emitting element 302 disposed on the substrate 301. The substrate 301 is parallel to a side plate 102, and is mounted on the side plate 102. For example, the substrate 301 and the side plate 102 mounted with the substrate 301 can be adhered with each other through a double faced adhesive tape 31. A base material of forming the substrate 301 can be resin, for example, FR4. Additionally, one light emergent side of the light-emitting element 302 is opposite to the light incident side of the LGP 20, so that light emitted from the light-emitting element 302 can be incident into the LGP 20 from a side of the LGP 20 and then pass through an optical dot at a bottom of the LGP 20. In this way, a total reflection of light inside the LGP 20 may be destroyed, and part of light inside the LGP 20 can be emergent from a top of the LGP 20.

In some examples, still referring to FIG. 3, the light-emitting element 302 includes a LED chip 3021 disposed on the substrate 301 and a fluorescent layer 3022 covering the LED chip 3021.

Figure 4A:
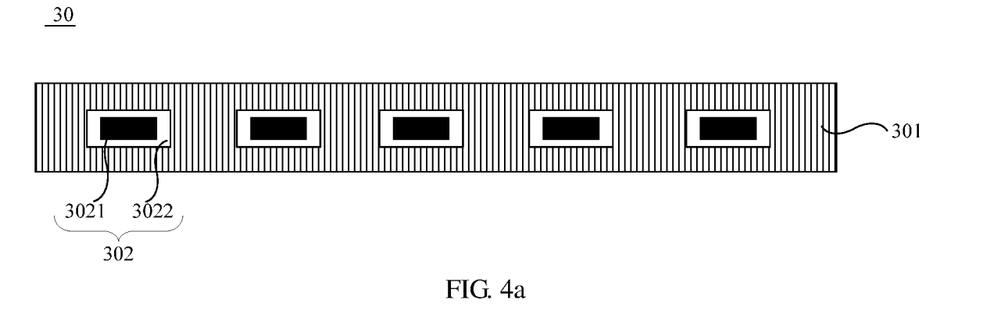
FIG. 4a is a right side view of the light source in FIG. 3.
Figure 4B:
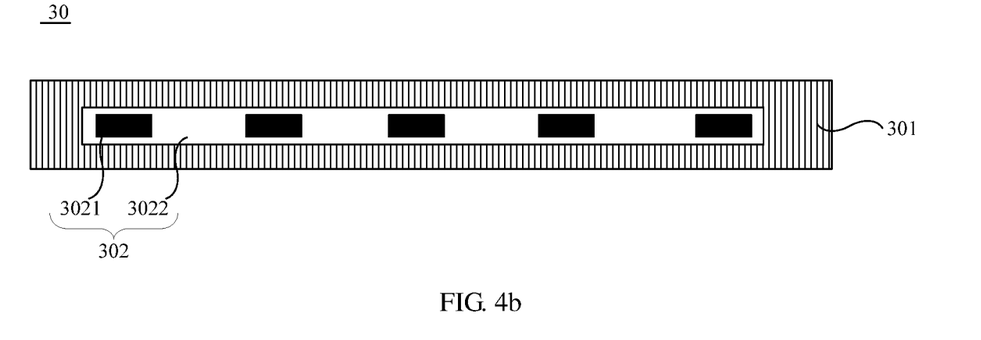
FIG. 4b is another right side view of the light source in FIG. 3.

In some examples, the substrate 301 can be provided with a plurality of light-emitting elements 302. As illustrated in FIG. 4a, fluorescent layers 3022 of adjacent two light-emitting elements 302 can be arranged at interval; or, as illustrated in FIG. 4b, fluorescent layers 3022 of all the light-emitting elements 302 can be integrally formed.

In some examples, a side of the substrate 301 provided with the light-emitting element 302 can possess a reflecting function. For example, the substrate 301 can include a base substrate and a reflecting layer covering the base substrate. In such example, the light source 30 can be a chip on board light (COB). COP has advantages of higher luminous efficiency and simpler manufacturing process.

Figure 5:
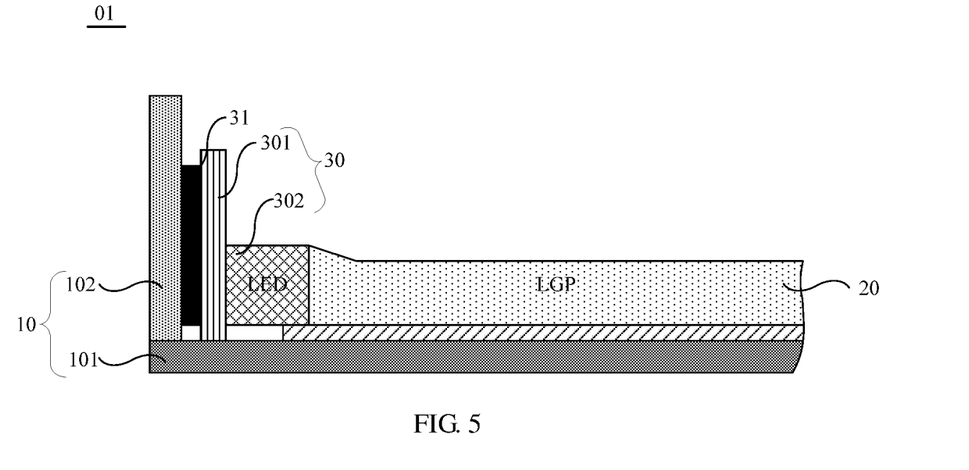
FIG. 5 is a structural diagram of another backlight module provided by an embodiment of the present disclosure.

In some examples, the light-emitting element 302 may have a relatively larger dimension (for example, a horizontal dimension and a vertical dimension as illustrated in FIG. 3), and correspondingly have a relatively greater emitting angle. In such case, for improving a rate of incidence at which light emitted from the light-emitting element 302 is incident into the LGP 20, a side of the LGP 20 close to the light-emitting element 302 can be formed into a wedge shape, as illustrated in FIG. 5. In such case, the side of the LGP 20 close to the light-emitting element 302 is greater than that of the remaining portion. In this way, the light incident side of the LGP 20 can completely cover one light emergent side of the light-emitting element 302, so that the light emitted from the light-emitting element 302 can be fully incident into the LGP 20 as far as possible.

Figure 6:
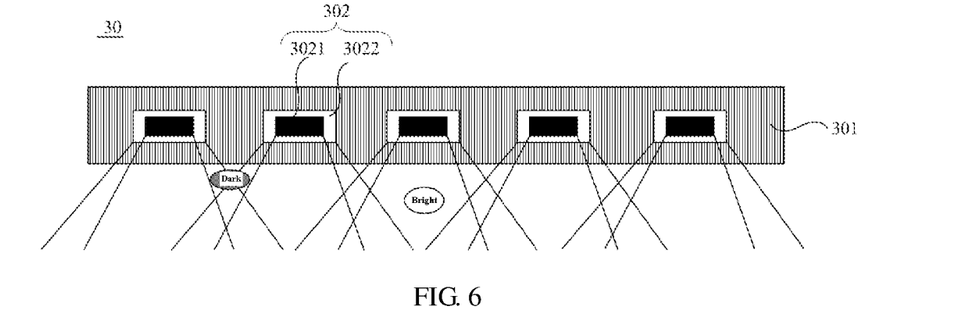

However, in the embodiment in which the light-emitting element 302 has a relatively greater dimension, an optical distance of the light-emitting element 302 will be correspondingly longer, as illustrated in FIG. 6. In such case, rays of light emitted from adjacent two light-emitting elements 302 will be intersected at an optical position to form a bright field, which may be liable to generate defects like hotspot or bright line. Additionally, if the rays of light emitted from the adjacent two light-emitting elements 302 intersect before arriving at the optical position, a dark field may be formed. An alternated arrangement of the above-mentioned bright field and dark field may lower the uniformity of the light emitted from the light source 30.

In order to avoid the problems above, some examples of the present disclosure may adopt a light-emitting element 302 with relatively smaller dimension. For example, a model number of the light-emitting element 302 can be 0.35 T or 0.3 T. In such case, the LED chip 3021 in the light-emitting element 302 can have a dimension of about 1.7×0.15 mm. In this way, the optical distance of the light-emitting element 302 can be reduced, so as to decrease a probability that the rays of light emitted from the light source 30 involve defects of bright field alternated with dark field.

In the examples above, because the light-emitting element 302 has relatively smaller dimension, it has no need of designing the LGP 20 to have a wedge shape as illustrated in FIG. 5; that is, it's possible for the light incident side of the LGP 20 to completely cover the light emergent side of the light-emitting element 302.

In some examples, the light-emitting element 302 may have other light emergent side(s) in addition to the light emergent side which is opposite to the light incident side of the LGP 20. As a result, there are still rays of light emergent all around the light-emitting element 302. In order to further improve the rate of incidence at which the light of the light-emitting element 302 is incident into the LGP 20 and hence to increase the brightness of the backlight module 01, in some examples, the light source 30 can further include a white wall 303, as illustrated FIG. 7. For example, at least one light emergent side of the light-emitting element 302, except the light emergent side opposite to the light incident side of the LGP 20, can be covered with the white wall 303. A material of forming the white wall 303 can be, for example, white resin such as Polyphthalamide (PPA), or silica gel.

During a manufacture process of the light source 30 in the embodiments above, the white wall 303 can be coated onto a surface (that is, the above-mentioned at least one light emergent side of the light-emitting element 302 except the light emergent side opposite to the light incident side of the LGP 20) of the light-emitting element 302 perpendicular to the substrate 301 by injection molding. In this way, the light emergent from the surface of the light-emitting element 302 perpendicular to the substrate 301 can be reflected by using the white wall 303, so as to allow more rays of light to be emergent from the light emergent side of the light-emitting element 302 opposite to the light incident side of the LGP 20, and hence to allow more rays of light to be incident into the LGP 20, thereby achieving the objective of improving the brightness of the backlight module 01.

Figure 7:
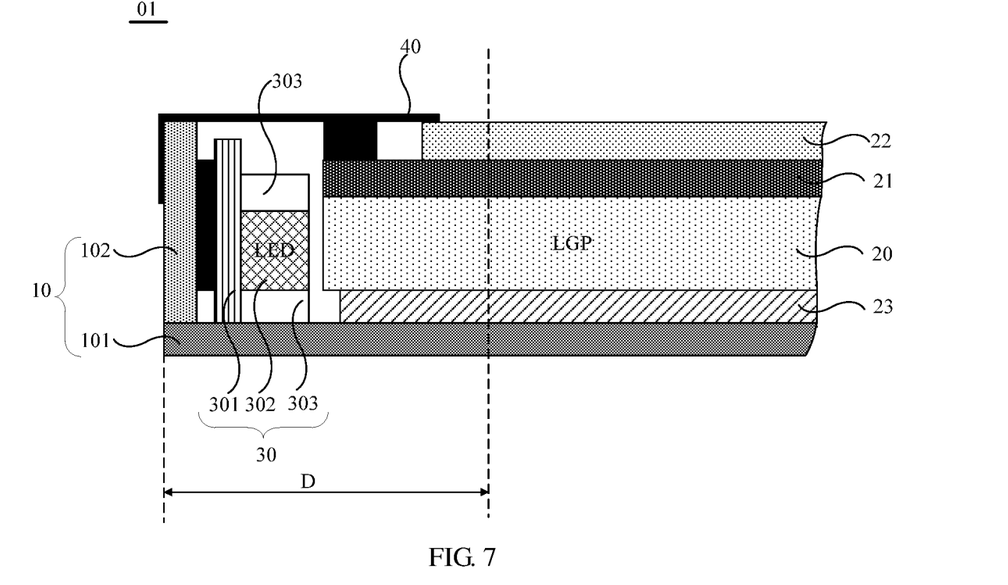
FIG. 7 is a structural diagram of a light source with a white wall in a backlight module provided by an embodiment of the present disclosure.

It should be explained that, the backlight module 01 in the embodiments of the present disclosure is provided with a light-shielding region, and a frame of the display device provided with the backlight module 01 can cover the light-shielding region. As a result, a magnitude of a width D of the light-shielding region as illustrated in FIG. 7 may be in direct proportion to a width of the frame of the corresponding display device.

In the embodiment of the present disclosure, the light source 30 is disposed in the light-shielding region. In order to prevent the light-shielding region from light leakage, in some examples, a light-shielding tape 30 is disposed above the light source 30, as illustrated in FIG. 7. In such case, the substrate 301 is mounted on a side plate 102 in a manner of being parallel to the side plate 102; that is, adopting an installation way of Top View. Because a length of the substrate 301 in the light source 30 is much greater than a thickness of the substrate 301, the installation way of Top View allows the light source 30 to occupy a smaller, horizontal dimension in the backlight module 01, as compared with the installation way of fixing the substrate 301 on the LGP 20 in a manner of being parallel to the base plate

101 (that is, adopting an installation way of Side View). In such case, it only needs to cover the entire light source 30 by using the above-mentioned light-shielding tape 40 along the thickness direction (i.e., the horizontal direction mentioned above) of the substrate 301, which can reduce the length of the light-shielding tape 40, and hence can reduce the width D of the light-shielding region, thereby achieving the objective of narrowing the frame.

In some examples, the substrate 301 can be provided with a wiring structure therein; the wiring structure is connected to the light-emitting element 302 and configured to drive the light-emitting element 302. In this way, it has no need of separately manufacturing a flexible printed circuit board (FPCB) having such wiring structure inside the light source 30, so as to further reduce the thickness (the horizontal dimension) of the light source 30. In such example, the substrate 301 can be made by using a hard material, for example, FR4 (epoxy glass fiber). In such case, the wiring structure can be formed inside the FR4 substrate. Alternatively, the substrate 301 can be a FPCB having the wiring structure above.

It should be explained that, the above-mentioned terms of orientation such as "horizontal direction", "vertical direction", "bottom" and "top" are defined with respect to an arrangement orientation of the backlight module 01 in the drawings. It should be appreciated that, these directional terms are relative concepts for relative description and clarification. When the arrangement orientation of the backlight module 01 is changed, these directional terms might also be changed accordingly.

Figure 8:
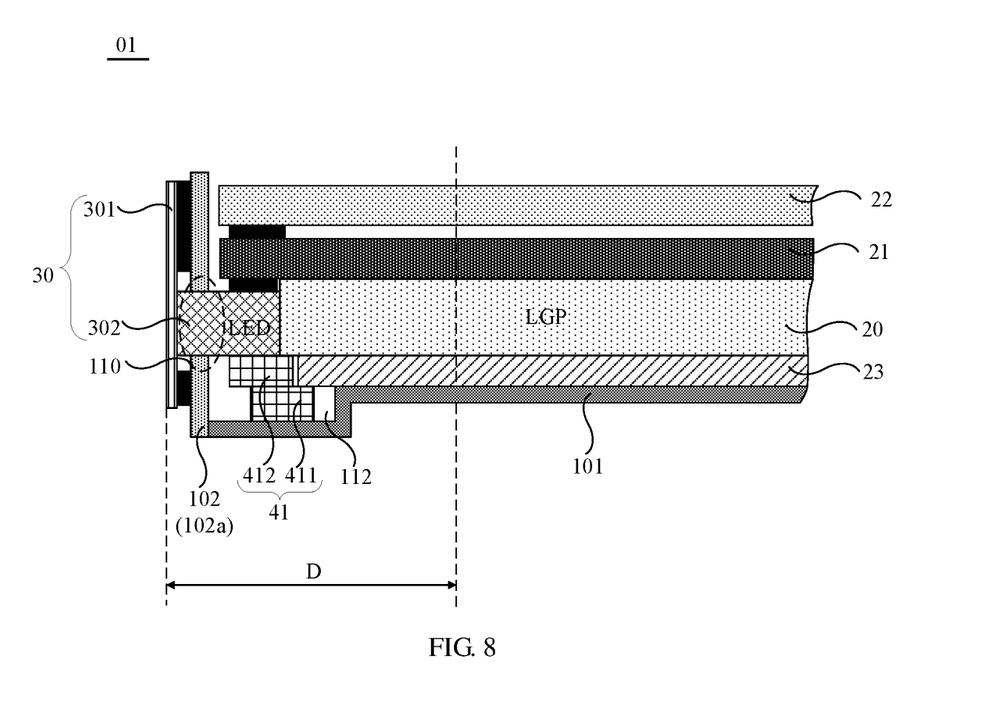
FIG. 8 is a schematic diagram illustrating an arrangement manner of a light source in a backlight module provided by an embodiment of the present disclosure.

In some examples, in order to reduce the width D of the light-shielding region in the backlight module 01, as illustrated in FIG. 8, the side plate 102 mounted with the substrate 301 is provided with a mounting hole 110 at a position corresponding to the light-emitting element 302; the light-emitting element 302 is mounted in the mounting hole 110 by passing through the mounting hole 110. In such example, the substrate 301 is connected to a surface of a side of the side plate 102 facing away from the LGP 20. For example, as mentioned above, the substrate 301 may be adhered onto the surface of the side of the side plate 102 facing away from the LGP 20 by using a double faced adhesive tape. In this way, when the light-emitting element 302 is mounted in the mounting hole 110 of the side plate 102 by passing through the mounting hole 110, a thickness of the side plate 102 contributes to part of the thickness of the light-emitting element 302, so as to further reduce the thickness of the light source 30 and decrease the horizontal dimension of the backlight module 01, thereby achieving the objective of narrow bezel of the display device.

Figure 9:
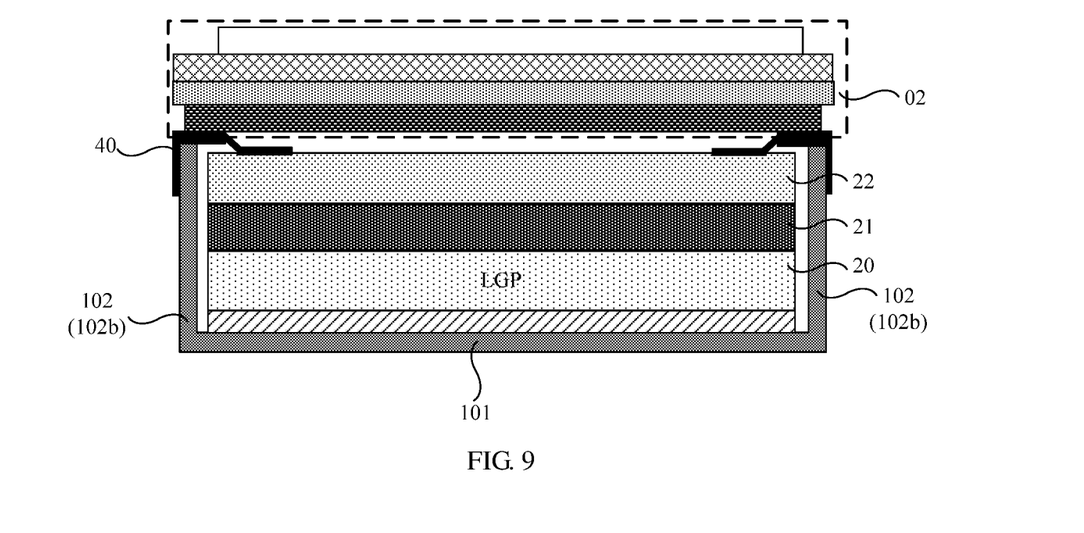
FIG. 9 is a structural diagram of a display device provided by an embodiment of the present disclosure.

Additionally, because the backlight module 01 in the embodiments of the present disclosure is configured to provide a display panel with backlight source, as illustrated in FIG. 9, the backlight module 01 is disposed in a non-display region of the display panel 02. In such case, the backlight module 01 also needs to support the display panel 02. If a side plate, among the plurality of side plates of the backlight module 01, that is mounted with the light source 30 is defined as a first side plate 102a (as illustrated in FIG. 8), the side plate among the plurality of side plates of the backlight module 01 that is not mounted with the light source 30 is defined as a second side plate 102b (as illustrated in FIG. 9), and the second side plate 102b can be configured to support the display panel 02. For example, the second side plate 102b (and/or the first side plate 102a) and the backboard 101 can be an integrally formed structure which is molded by a single stamping process.

Under such circumstance, in order to improve a supporting performance of the second side plate 102b, in some examples, a material of forming the second side plate 102b can be a metallic material with harder property, for example, stainless steel (by way of example, a model number of the stainless steel can be SUS304); in order for convenience of manufacture, the side plate 102 and the base plate 101 in the backboard 10 can be an integrally formed structure, and a material of forming the backboard 10 can be the above-mentioned metallic material for forming the second side plate 102b.

In some examples, the backlight module 01 is in a shape of rectangular, and hence includes four side plates 102 which are connected end to end. If one side of the LGP 20 is the light incident side of the LGP 20, only one of the four side plates 102 that is opposite to the light incident side of the LGP 20 is the above-mentioned first side plate 102a. In such case, excluding the first side plate 102a, the remaining three side plates among the above-mentioned four side plates 102 each are a second side plate 102b for supporting the display panel 02.

Alternatively, when the LGP 20 has two opposite sides used as light incident sides, two of the four side plates 102 that are opposite to each other and are corresponding to the two light incident sides of the LGP 20 both are the second side plate 102a. In such case, as illustrated in FIG. 9, excluding the two first side plates 102a opposite to each other, the remaining two opposite side plates 102 among the above-mentioned four side plates 102 both are the second side plate 102 for supporting two opposite ends of the display panel 02.

It can be seen from the above that, the backlight module 01 can support the display panel 02 through the second side plate 102b. As a result, it has no need of providing a rubber frame in the backlight module 01, so as to omit the thickness of the rubber frame from the backlight module 01, and hence to further reduce the horizontal dimension of the backlight module 01, which is beneficial for realizing narrow bezel.

Figure 10:
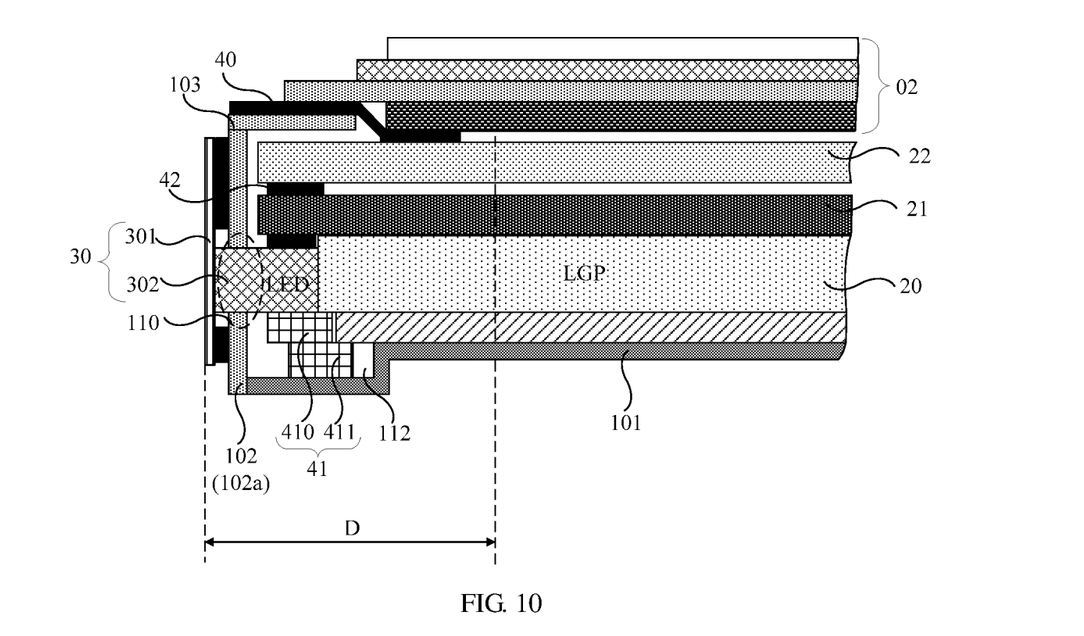
FIG. 10 is a schematic diagram illustrating a partial structure of one side of a display device provided with a light source, according to an embodiment of the present disclosure.

For the examples above, in order to further improve the effect of supporting the display panel 02 by the backlight module 01, as illustrated in FIG. 10, a position that is on a surface of a side of the first side plate 102a facing away from the base plate 101 and is located in the light-shielding region of the backlight module 01, is provided with a support plate 103. The support plate 103 is connected to the first side plate 102a, and is parallel to the base plate 101. The support plate 103 is configured to support the display panel 02. In this way, a side of the backlight module 01 provided with the first side plate 102a can support the display panel 02 through the support plate 103, so as to prevent a side of the display panel 02 supported by the side of the backlight module 01 provided with the first side plate 102a from being directly contacted with other optical film(s) in the backlight module 01 such as diffusion plate 21 and prismatic lens plate 22 which may cause a pressure on the optical film(s).

It can be seen from the above that, in the embodiments of the present disclosure, the substrate 301 of the light source 30 is mounted on the first side plate 102a in a manner of being parallel to the first side plate 102a, and an interior of the substrate 301 is manufactured with a wring structure for driving the light-emitting element 302 to emit light. Under such circumstance, when the wiring structure has relatively complex structure, the dimension of the substrate 301 has to be increased. In order to prevent from increasing the thickness of the substrate 301 and resulting in increased horizontal dimension of the backlight module 01, it can increase the vertical dimension of the substrate 301. In such case, for effectively fixing and mounting the substrate 301, in some examples, it also has to increase the vertical dimension (height) of the first side plate 102 to be mounted with the substrate 301, so as to allow the height of the first side plate 102a to be greater than the height of the second side plate 102b.

In such case, as illustrated in FIG. 10, in some examples, a position on the base plate 101 that is close to the first side plate 102a and is located in the light-shielding region of the backlight module 01 can be provided with a concaved portion 112. The concaved portion 112 is protruded from a lower surface of the base plate 101 (a surface of the base plate 101 facing away from the LGP 20) along a direction facing away from the LGP 20. In this way, by arranging the concaved portion 112 on the base plate 101, the base plate 101 can be connected to the first side plate 102a with increased height, and the substrate 301 with relatively greater vertical dimension can be fixed through the first side plate 102a with increased height.

Without providing the above-mentioned support plate 103, the display panel 02 can be supported by the second side plate 102b as mentioned above. In such case, an upper surface of the second side plate 102b can be flush with or above an upper surface of the first side plate 102a, so that the display panel 02 can be contacted with the second side plate 102b.

Additionally, in the case of providing the support plate 103, in order to maintain a horizontality of an upper surface of the display panel 02 located at the light emergent side of the backlight module 01, in some examples, the support plate 103 can be flush with a surface of a side of the second side plate 102b facing away from the base plate 101, so that the upper surface of the display panel 02 can have a higher flatness by the support from the first side plate 102a and the support plate 103.

On account of this, when the base plate 101 is provided with the concaved portion 112, in order to support the light-emitting element 302 located above the concaved portion 112, in some examples, at least one pad layer 41 can be provided between the light-emitting element 302 and a lower surface of the concaved portion 112, as illustrated in FIG. 8.

In such case, as illustrated in FIG. 8, when the backlight module 01 further includes a reflector plate 23 located between the LGP 20 and the base plate 101, the above-mentioned at least one pad layer includes a first pad sublayer 411 and a second pad sublayer 412 which are sequentially located on the base plate 101 and connected with each other. For example, the first pad sublayer 411 is connected to a lower surface of the reflector plate 23. In this way, when the base plate 101 is provided with the concaved portion 112 so that a part of the reflector plate 23 is suspended and cannot be contacted with the base plate 101 except the concaved portion 112, the first pad sublayer 411 can support the part of the reflector plate 23 suspended above the concaved portion 112. Light emitted from the light source 30 can be reflected into the LGP 20 by the reflector plate 23, so as to improve the utilization of light emitted from the light source 30.

Additionally, when the light source includes the light-emitting element 302, the second pad sublayer 412 can be connected to both of the light-emitting element 302 and the LGP 20. In this way, the light-emitting element 302 and the LGP 20 suspended above the concaved portion 112 can be supported by the first pad sublayer 411 and the second pad sublayer 412.

A material of forming the first pad sublayer 411 and the second pad sublayer 412 can be double faced adhesive tape. In this way, the first pad sublayer 411 not only supports the reflector plate 23 but also fixes a mounting position of the reflector plate 23. Additionally, in a similar way, the second pad sublayer 412 can also fix the mounting position of the light-emitting element 302 and the LGP 20.

The fixing manners of the light-emitting element 302, the reflector plate 23 and the LGP 20 are described in the foregoing with reference to the case where the base plate 101 is provided with the concaved portion 112. In other examples, as illustrated in FIG. 7, when an upper surface (a surface of the side close to the LGP 20) of the base plate 101 is a flat surface, the light-emitting element 302 and the LGP 20 both are contacted with the upper surface of the reflector plate 23. In such case, because the reflector plate 23 is completely supported on the upper surface of the base plate 101, the base plate 101 can support both of the light-emitting element 302 and the LGP 20 through the reflector plate 23 by allowing both of the light-emitting element 302 and the LGP 20 to be contacted with the upper surface of the reflector plate 23.

On account of this, in some examples, a bonding layer can be disposed between lower surfaces of the light-emitting element 302 and the LGP 20 (the surface of the side close to the base plate 101) and the upper surface of the base plate 101. The bonding layer can be a black double faced adhesive tape.

Additionally, in order for the backlight module 01 to provide the display panel 02 with an area light source with high brightness and high uniformity, in some examples, the backlight module 01 further includes some optical films, for example, a diffusion plate 21 and at least one layer of prismatic lens plate 22 sequentially stacked on the upper surface of the LGP 20 (the side facing away from the base plate 101). With the arrangement of the diffusion plate 21, light emergent from the LGP 20 can be atomized, so as to improve the uniformity of the light emergent from the backlight module 01. Additionally, the prismatic lens plate 22 can converge the light passing through the diffusion plate 21 into a smaller range, so as to achieve the effect of increasing the brightness.

Figure 11:
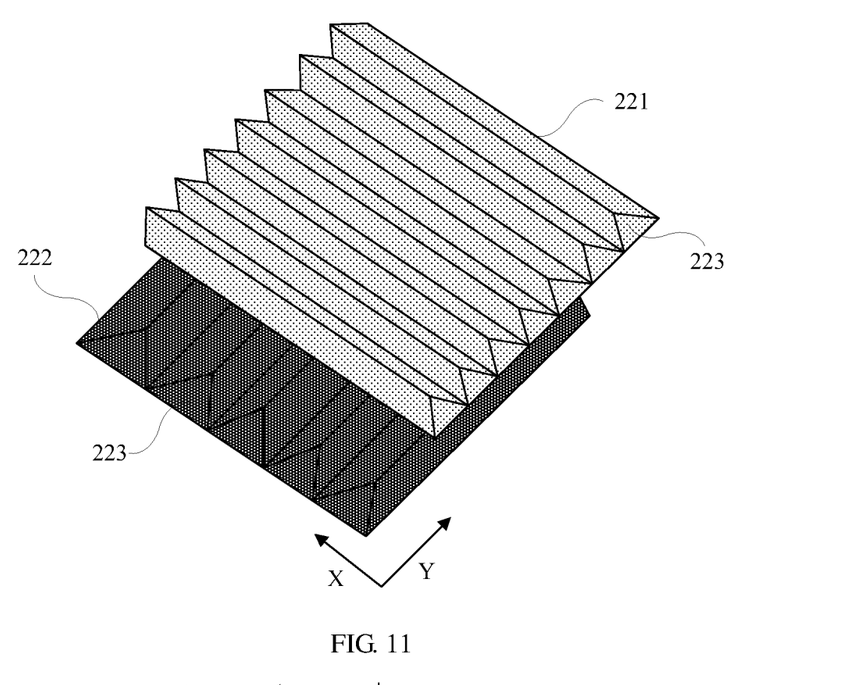
FIG. 11 is a structural diagram of two layers of prismatic lens plates included in the backlight module illustrated in FIG. 10.

As illustrated in FIG. 11, in some examples, the at least one layer of prismatic lens plate 22 includes an upper prismatic lens plate (Up-prism) 221 and a lower prismatic lens plate (Down-prism) 222. An extending direction X of a prismatic lens 223 on the Up-prism 221 is perpendicular to an extending direction Y of a prismatic lens 223 on the Down-prism 222. In this way, the Up-prism 221 can increase the brightness of emergent light in the X direction while the Down-prism 222 can increase the brightness of emergent light in the Y direction, so that the light emergent from respective positions of the prismatic lens plate 22 can have increased brightness which is uniform everywhere.

Alternatively, in some examples, the backlight module 02 can only include one prismatic lens plate 22. In such case, the prismatic lens plate 22 can include both of a prismatic lens 223 extending in the X direction and a prismatic lens 223 extending in the Y direction.

Hereinafter, the fixing manner of the diffusion plate 21 and the prismatic lens plate 22 in the backlight module 01 provided by the embodiments of the present disclosure will be described by way of example.

In some examples, as illustrated in FIG. 10, an adhesive layer 42 is disposed between the prismatic lens plate 22 and the diffusion plate 21, in the light-shielding region of the backlight module 01; and the adhesive layer 42 is also disposed between the diffusion plate 21 and the LGP 20. A material of forming the adhesive layer 42 can be black double faced adhesive tape. The adhesive layer 42 is usually disposed at a side provided with the light source 30.

Under such circumstance, in the light-shielding region, a surface of a side of the prismatic lens plate 22 facing away from the diffusion plate 21 is adhered with an end of a light-shielding tape 40, and the other end of the light-shielding tape 40 can be adhered onto the side plate 102. Four sides of the prismatic lens plate 22 each can be provided with the above-mentioned light-shielding tape 40. In such case, other ends of different light-shielding tapes 40 can be fixed on different side plates 102.

For example, the other end of the light-shielding tape 40 located on the side of the first side plate 102a provided with the light source 30 is fixed on the first side plate 102a; or, the other end of the light-shielding tape 40 located on the side of the second side plate 102b being not provided with the light source 30 is fixed on the second side plate 102b. For another example, as illustrated in FIG. 10, when a support plate 103 is disposed above the first side plate 102a, the other end of the light-shielding tape 40 located on a side of the first side plate 102a can be fixed on the upper surface of the support plate 103.

Figure 12:
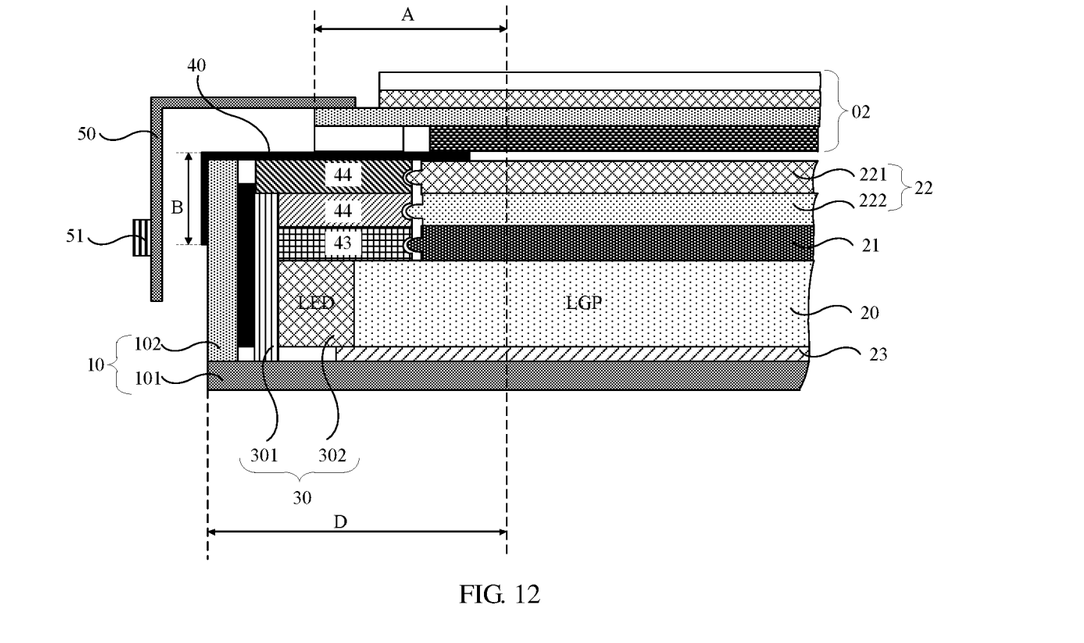
FIG. 12 is a schematic diagram illustrating another partial structure of one side of a display device provided with a light source, according to an embodiment of the present disclosure.

Alternatively, the diffusion plate 21 and the prismatic lens plate 22 can be fixed in other manners. For example, as illustrated in FIG. 12, a first connecting layer is disposed on the upper surface of the LGP 20, between the diffusion plate 21 and the side plate 102. The first connecting layer 43 and a side of the diffusion plate 21 are engaged with each other. For example, a side of the first connecting layer 43 close to the diffusion plate 21 is provided with a recess, a side of the diffusion plate 21 close to the first connecting layer 43 is provided with a lug, a position of the lug is corresponding to that of the recess, and a shape of the lug is matched with that of the recess, so that when the side of the first connecting layer 32 is contacted with the side of the diffusion plate 21, the lug can be engaged into the recess so as to fix the diffusion plate 21.

The above is described with reference to the case where the first connecting layer 43 is provided with a recess while the diffusion plate 21 is provided with a lug by way of example. Of course, it's also possible that the side of the first connecting layer 43 is provided with a lug while the side of the diffusion plate 21 is provided with a recess. The embodiments of the present disclosure are not limited thereto.

Additionally, in order to fix the prismatic lens plate 22, in some examples, an upper surface of the first connecting layer 43 can be provided with a second connecting layer 44. The second connecting layer 44 and the side of the prismatic lens plate 22 are engaged with each other. The engaging manner can be referred to the foregoing examples, without particularly described herein.

Figure 13:
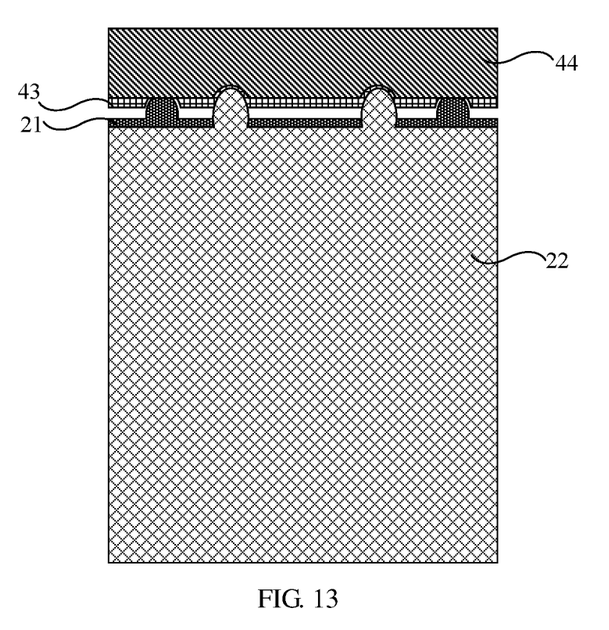
FIG. 13 is a top view illustrating a fixing manner between a diffusion plate and a prismatic lens plate in the display device illustrated in FIG. 12.

It should be explained that, when the backlight module 01 includes the Up-prism 221 and the Down-prism 222, it's possible to sequentially stack two second connecting layers 44 on the upper surface of the first connecting layer 43, so as to fix the Up-prism 221 and the Down-prism 222 by engaging the Up-prism 221 and the Down-prism 222 with the respective second connecting layers 44 as mentioned above. FIG. 13 is a top view illustrating the first connecting layer 43 engaging with the diffusion plate 21, and the second connecting layer 44 engaging with the prismatic lens plate 22.

In some examples, a material of forming the first connecting layer 43 and the second connecting layer 44 can be double faced adhesive tape. In this way, by means of the stickiness of the double faced adhesive tape, the first connecting layer 43 can be adhered onto the upper surface of the light-emitting element 302 and of the LGP 20 while the second connecting layer 44 can be adhered onto the upper surface of the first connecting layer 43.

It should be explained that, the lug or recess on the first connecting layer 43 and the second connecting layer 44 can be formed at the same time when forming the first connecting layer 43 and the second connecting layer 44 in a main body of the double faced adhesive tape by cutting.

Additionally, the first connecting layer 43 and the second connecting layer 44 can be disposed on two opposite ends of the diffusion plate 21 and the prismatic lens plate 22, or be disposed all around the diffusion plate 21 and the prismatic lens plate 22.

On account of this, as illustrated in FIG. 12, one end of the light-shielding tape 40 can be adhered onto the upper surface of the prismatic lens plate 22, and the other end of the light-shielding tape 40 can be adhered onto the surface of the side of the side plate 102 facing away from the LGP 20. A length B of a portion of the light-shielding tape 40 adhered onto the side plate 102 is not particularly limited in the embodiments of the present disclosure. Those skilled in the art can adjust the length B according to the dimension of the optical film(s). For example, when the optical film has relatively greater dimension, the length B can be increased properly; vice versa.

Embodiments of the present disclosure provide a display device including the backlight module 01 described in any of embodiments above. The display device further includes a display panel 02 disposed at the light emergent side of the backlight module 01.

It should be explained that, in the embodiments of the present disclosure, the display device can be any product or component with display function, such as liquid crystal displayer, liquid crystal television, digital photo frame, mobile phone and tablet computer.

In the display device provided by the embodiments of the present disclosure, for the display panel 02, as illustrated in FIG. 12, a driving chip 51 (IC) can be disposed on a FPCB 50 or a COF, so as to reduce a width A of a non-display region on the display panel 02. As mentioned above, because the frame of the display device is required to cover the width D of the light-shielding region of the backlight module 01 and to cover the bended FPCB 50, and because the width D of the light-shielding region of the backlight module 01 has been reduced by the technical solutions provided by the embodiments above, the width of the frame is decreased, correspondingly. For example, when the display device is a mobile phone, a frame of module of the mobile phone can have a width controlled within 1.5 mm, while a frame of mobile phone usually has a width of about 5.0 mm. As a result, the display device provided by the embodiment of the present disclosure can effectively achieve the design of narrow bezel.

The foregoing embodiments merely are exemplary embodiments of the disclosure and not intended to define the scope of the disclosure, and any variations or replacements which can be easily thought of by those skilled in the art in the technical scope of the disclosure shall fall within the scope of disclosure. Therefore, the scope of the disclosure shall be determined by the scope of the appended claims.

The present disclosure claims the benefits of Chinese patent application No. 201710629143.2, which was filed with the SIPO on Jul. 27, 2017 under the title of "A BACKLIGHT MODULE AND A DISPLAY DEVICE" and is fully incorporated herein by reference as part of this application.

The invention claimed is:

1. A backlight module, comprising a backboard, the backboard comprising a base plate and a plurality of side plates perpendicular to the base plate; the plurality of side plates being connected end to end around the base plate and defining an accommodating space having an opening with the base plate;
the backlight module further comprising a light guide plate (LGP) located in the accommodating space and a light source located at a light incident side of the LGP; and
the light source comprising a substrate and a light-emitting element on the substrate, the substrate being parallel to and mounted on one of the plurality of side plates; one light emergent side of the light-emitting element being opposite to the light incident side of the LGP, wherein
the backlight module is at a non-display side of a display panel;
the plurality of side plates comprise a first side plate mounted with the substrate and a second side being not mounted with the substrate, the second side plate is configured to support the display panel;
in a light-shielding region of the backlight module, a position on the base plate close to the first side plate is provided with a concaved portion;
the concaved portion is protruded from a side of the base plate facing away from the LGP, along a direction facing away from the LGP;
a length of the first side plate in a direction perpendicular to the base plate is greater than a length of the second side plate in the direction perpendicular to the base plate, and an upper surface of the second side plate is flush with an upper surface of the first side plate,
at least one pad layer is between the light-emitting element and a lower surface of the concaved portion, and a reflector plate is located between the LGP and the base plate;
the at least one pad layer comprises a first pad sublayer and a second pad sublayer which are sequentially stacked on the base plate and are connected to each other;
wherein
the first pad sublayer is connected to a lower surface of the reflector plate; and
the second pad sublayer is connected to the light-emitting element and the LGP.

2. The backlight module according to claim 1, wherein the substrate is provided with a wiring structure which is connected to the light-emitting element and is configured to drive the light-emitting element.

3. The backlight module according to claim 1, wherein the side plate mounted with the substrate is provided with a mounting hole at a position corresponding to the light-emitting element, the light-emitting element is fitted in the mounting hole by passing through the mounting hole; and
the substrate is connected to a surface of a first side of the side plate mounted with the substrate, the first side is facing away from the LGP.

4. The backlight module according to claim 1, further comprising a diffusion plate and at least one layer of prismatic lens plate which are stacked sequentially at a side of the LGP facing away from the base plate;

an adhesive layer is between the prismatic lens plate and the diffusion plate, in a light-shielding region of the backlight module; wherein
in the light-shielding region, a side of the prismatic lens plate facing away from the diffusion plate is adhered with one end of a light-shielding tape, and the other end of the light-shielding tape is adhered to the side plate.

5. The backlight module according to claim 1, further comprising a diffusion plate and at least one layer of prismatic lens plate which are stacked sequentially at a side of the LGP facing away from the base plate;
a first connecting layer is on a surface of the side of the LGP facing away from the base plate, between the diffusion plate and the side plate; the first connecting layer and a side of the diffusion plate are engaged with each other; and
an upper surface of the first connecting layer is provided with a second connecting layer; the second connecting layer and a side of the prismatic lens plate are engaged with each other.

6. The backlight module according to claim 1, wherein a support plate is on a surface of a side of the first side plate facing away from the base plate, in a light-shielding region of the backlight module;
the support plate is connected to the first side plate and is parallel to the base plate; and
the support plate is configured to support the display panel.

7. The backlight module according to claim 1, wherein at least one light emergent side of the light-emitting element, except a light emergent side opposite to the light incident side of the LGP, is covered with a white wall; and
a material of forming the white wall is white resin or silica gel.

8. The backlight module according to claim 1, wherein the light-emitting element comprises a LED chip on the substrate and a fluorescent layer covering the LED chip; wherein
the substrate is provided with a plurality of light-emitting elements, fluorescent layers of adjacent two light-emitting elements are arranged at interval; or, fluorescent layers of all the light-emitting elements are integrally formed.

9. The backlight module according to claim 1, wherein the substrate of the light source and the side plate mounted with the substrate are adhered with each other through a double faced adhesive tape.

10. The backlight module according to claim 5, wherein a material of forming the first connecting layer and the second connecting layer is double faced adhesive tape.

11. The backlight module according to claim 4, wherein the at least one layer of prismatic lens plate comprises an upper prismatic lens plate and a lower prismatic lens plate; and
an extending direction X of a prismatic lens on the upper prismatic lens plate is perpendicular to an extending direction Y of a prismatic lens on the lower prismatic lens plate.

12. A display device, comprising a backlight module, the backlight module comprising a backboard, the backboard comprising a base plate and a plurality of side plates perpendicular to the base plate; the plurality of side plates being connected end to end around the base plate and defining an accommodating space having an opening with the base plate;

the backlight module further comprising a light guide plate (LGP) located in the accommodating space and a light source located at a light incident side of the LGP; and the light source comprising a substrate and a light-emitting element on the substrate, the substrate being parallel to and mounted on one of the plurality of side plates; one light emergent side of the light-emitting element being opposite to the light incident side of the LGP, wherein the backlight module is at a non-display side of a display panel;

the plurality of side plates comprise a first side plate mounted with the substrate and a second side being not mounted with the substrate, the second side plate is configured to support the display panel;

in a light-shielding region of the backlight module, a position on the base plate close to the first side plate is provided with a concaved portion;

the concaved portion is protruded from a side of the base plate facing away from the LGP, along a direction facing away from the LGP;

a length of the first side plate in a direction perpendicular to the base plate is greater than a length of the second side plate in the direction perpendicular to the base plate, and an upper surface of the second side plate is flush with an upper surface of the first side plate, at least one pad layer is between the light-emitting element and a lower surface of the concaved portion, and a reflector plate is located between the LGP and the base plate;

the at least one pad layer comprises a first pad sublayer and a second pad sublayer which are sequentially stacked on the base plate and are connected to each other; wherein the first pad sublayer is connected to a lower surface of the reflector plate; and the second pad sublayer is connected to the light-emitting element and the LGP.

13. The backlight module according to claim 5, wherein the at least one layer of prismatic lens plate comprises an upper prismatic lens plate and a lower prismatic lens plate; and an extending direction X of a prismatic lens on the upper prismatic lens plate is perpendicular to an extending direction Y of a prismatic lens on the lower prismatic lens plate.

14. The backlight module according to claim 5, wherein the at least one layer of prismatic lens plate comprises a single prismatic lens plate, and the single prismatic lens plate comprises two prismatic lenses of which extending directions are perpendicular to each other.

\* \* \* \* \*